US012561975B2

(12) United States Patent
Moharana et al.

(10) Patent No.: US 12,561,975 B2
(45) Date of Patent: Feb. 24, 2026

(54) METHOD AND SYSTEM FOR DETECTING PRIVATE VIDEO

(71) Applicant: Samsung Electronics Co., Ltd., Suwon-si (KR)

(72) Inventors: Sukumar Moharana, Karnataka (IN); Debi Prasanna Mohanty, Karnataka (IN); Siva Prasad Thota, Karnataka (IN); Archit Panwar, Karnataka (IN); Dewang Agarwal, Karnataka (IN); Anchal Pandey, Karnataka (IN); Vanraj Vala, Karnataka (IN); Dwaraka Bhamidipati Sreevatsa, Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 376 days.

(21) Appl. No.: 18/327,385

(22) Filed: Jun. 1, 2023

(65) Prior Publication Data

US 2023/0351751 A1      Nov. 2, 2023

Related U.S. Application Data

(63) Continuation of application No. PCT/KR2023/001459, filed on Feb. 1, 2023.

(30) Foreign Application Priority Data

May 2, 2022      (IN) .............................. 202241025604
Nov. 10, 2022   (IN) .............................. 202241025604

(51) Int. Cl.
*G06V 20/40*          (2022.01)
*G06V 10/764*        (2022.01)
*H04N 7/01*           (2006.01)

(52) U.S. Cl.
CPC ............ *G06V 20/41* (2022.01); *G06V 10/764* (2022.01); *G06V 20/46* (2022.01); *H04N 7/0117* (2013.01)

(58) Field of Classification Search
CPC ...... G06V 20/41; G06V 20/46; G06V 10/764; H04N 7/0117
See application file for complete search history.

(56) References Cited

U.S. PATENT DOCUMENTS 8,285,042 B2    10/2012  Park
8,880,534 B1 *  11/2014  Aradhye ................. G06F 16/78
                                                            707/748

(Continued)

FOREIGN PATENT DOCUMENTS

CN      113505680 A    10/2021
EP      3 901 785 A1   10/2021

(Continued)

OTHER PUBLICATIONS

International Search Report for PCT/KR2023/001459 mailed May 10, 2023, 3 pages.

(Continued)

*Primary Examiner* — Utpal D Shah
(74) *Attorney, Agent, or Firm* — Nixon & Vanderhye P.C.

(57)              ABSTRACT

A method for detecting a private video may include estimating a low (e.g., minimum) resolution for performing analysis of a plurality of frames of a video. The method may include reducing a first resolution associated with the plurality of frames to the low (e.g., minimum) resolution. The method may include detecting a presence of at least one indicator for private information in one or more frames amongst the plurality of frames upon analyzing the plurality of frames at the low (e.g., minimum) resolution. The method may include detecting a presence of the private information in the video upon analyzing the one or more frames com- (Continued)

300

Receiving the video as an input ~302

Extracting the number of frames from the video ~304

Estimating the minimum resolution suitable for processing the number of frames extracted from the video ~306

Reducing a first resolution related to the number of frames to the minimum resolution ~308

Analyzing the number of frames of the video at the minimum resolution to detect at least one indicator of private information ~310

Analyzing the one or more frames in the video to detect a presence of the private information in the video ~312

Classifying the video as the private video by the processor ~314

Providing one or more suggestions to a viewer ~316 prising the at least one indicator at a second resolution in response to detecting the presence of the at least one indicator at the low (e.g., minimum) resolution. The method includes classifying the video as the private video in response to detecting the presence of the private information in the video at the second resolution.

14 Claims, 8 Drawing Sheets

(56)                    References Cited

U.S. PATENT DOCUMENTS

| | | | |
|---|---|---|---|
| 10,176,500 | B1 | 1/2019 | Mohan |
| 10,516,916 | B2 | 12/2019 | Skarakis |
| 10,699,126 | B2 * | 6/2020 | Karyodisa ............ G06V 40/167 |
| 2003/0012399 | A1 | 1/2003 | Wu |
| 2010/0215268 | A1 | 8/2010 | Park |
| 2017/0289624 | A1 | 10/2017 | Avila et al. |
| 2019/0218407 | A1 * | 7/2019 | Borras ................ H04L 63/0442 |
| 2020/0151460 | A1 * | 5/2020 | Korenwaitz ..... H04N 21/23418 |

FOREIGN PATENT DOCUMENTS

| | | | |
|---|---|---|---|
| EP | 3571837 | B1 | 10/2021 |
| KR | 100930869 | B1 | 12/2009 |
| KR | 101586652 | B1 | 1/2016 |
| KR | 20160107734 | A | 9/2016 |
| KR | 20200016085 | A | 2/2020 |
| TW | I253568 | B | 4/2006 |
| WO | WO 2022/025603 | A1 | 2/2022 |

OTHER PUBLICATIONS

Written Opinion of the ISA for PCT/KR2023/001459 mailed May 10, 2023, 5 pages.
India Examination Report dated Apr. 2, 2025 for IN Application No. 202241025604.

* cited by examiner

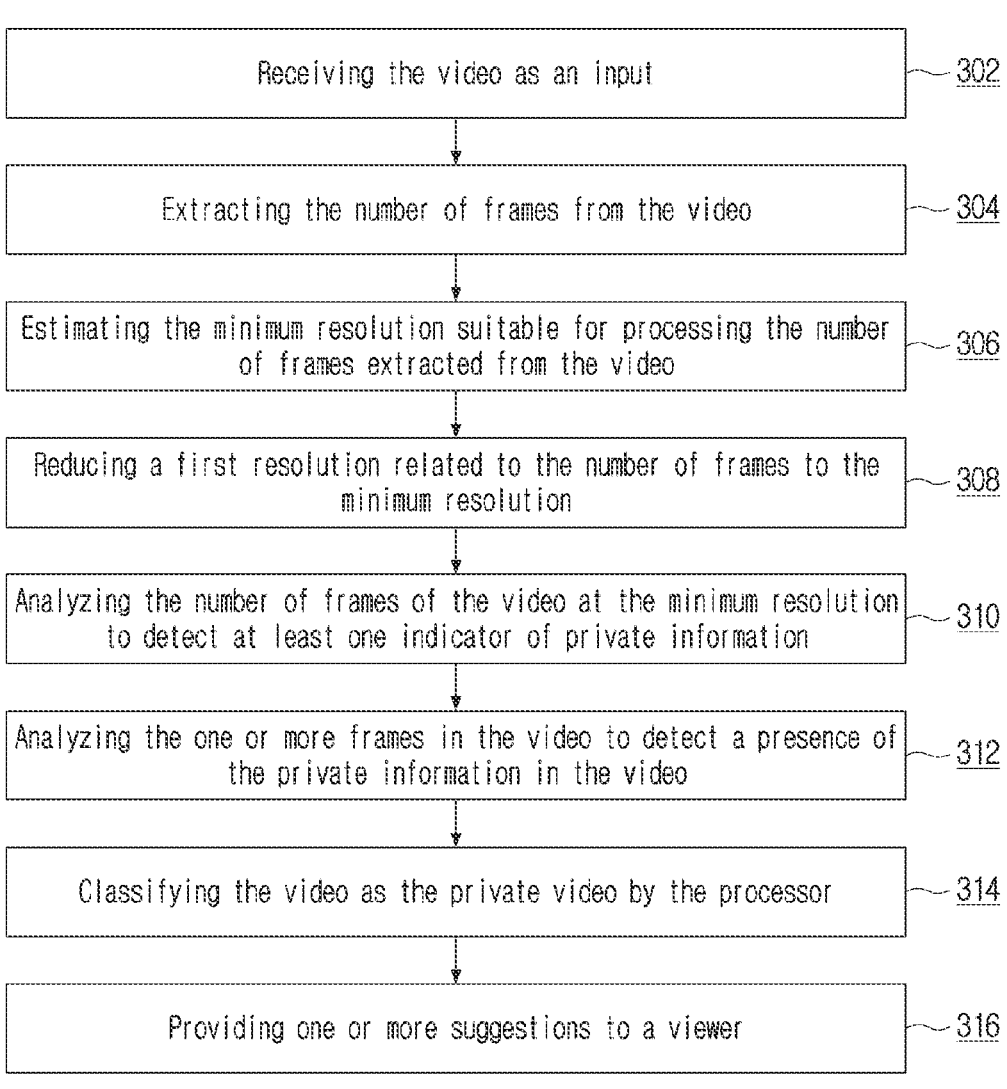

300

Receiving the video as an input — 302

Extracting the number of frames from the video — 304

Estimating the minimum resolution suitable for processing the number of frames extracted from the video — 306

Reducing a first resolution related to the number of frames to the minimum resolution — 308

Analyzing the number of frames of the video at the minimum resolution to detect at least one indicator of private information — 310

Analyzing the one or more frames in the video to detect a presence of the private information in the video — 312

Classifying the video as the private video by the processor — 314

Providing one or more suggestions to a viewer — 316

Figure 4:
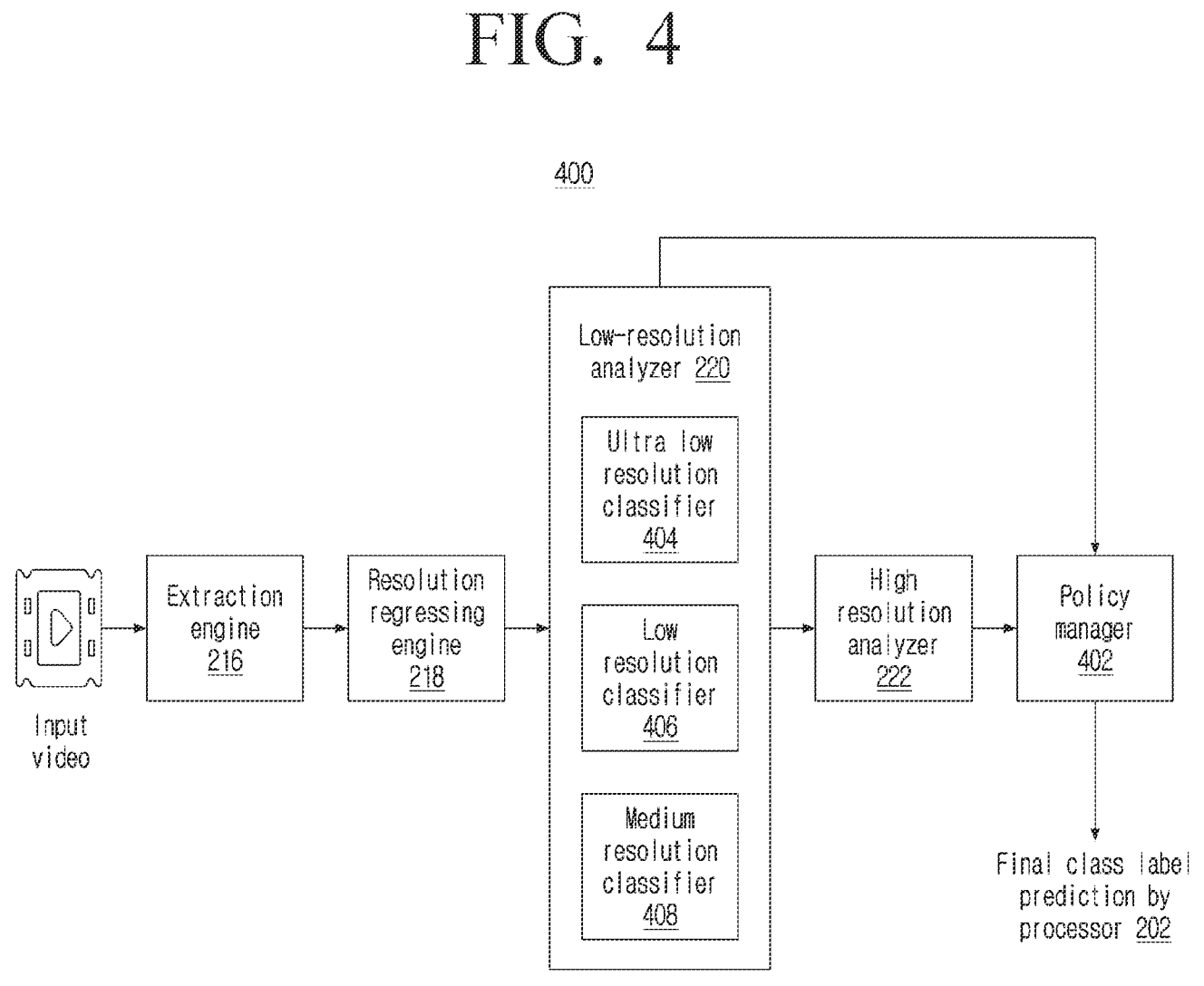

Input video → Extraction engine 216 → Resolution regressing engine 218 → Low-resolution analyzer 220

Low-resolution analyzer 220:
- Ultra low resolution classifier 404
- Low resolution classifier 406
- Medium resolution classifier 408

Low-resolution analyzer 220 → High resolution analyzer 222 → Policy manager 402 → Final class label prediction by processor 202

Figure 6:
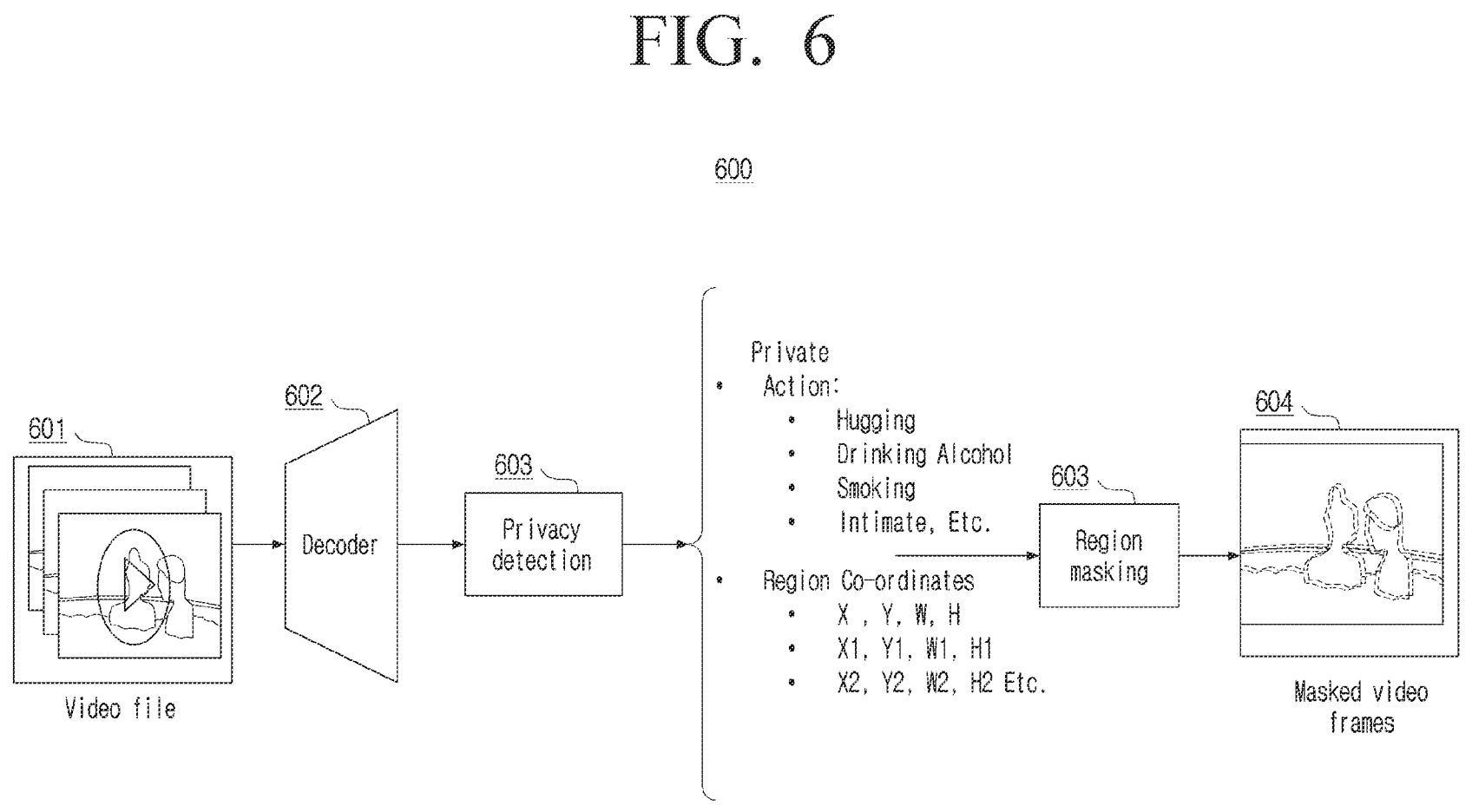

601  Video file

602  Decoder

603  Privacy detection

Private
Action:
 • Hugging
 • Drinking Alcohol
 • Smoking
 • Intimate, Etc.

Region Co-ordinates
 • X , Y , W, H
 • X1, Y1, W1, H1
 • X2, Y2, W2, H2 Etc.

603  Region masking

604  Masked video frames

FIG. 7

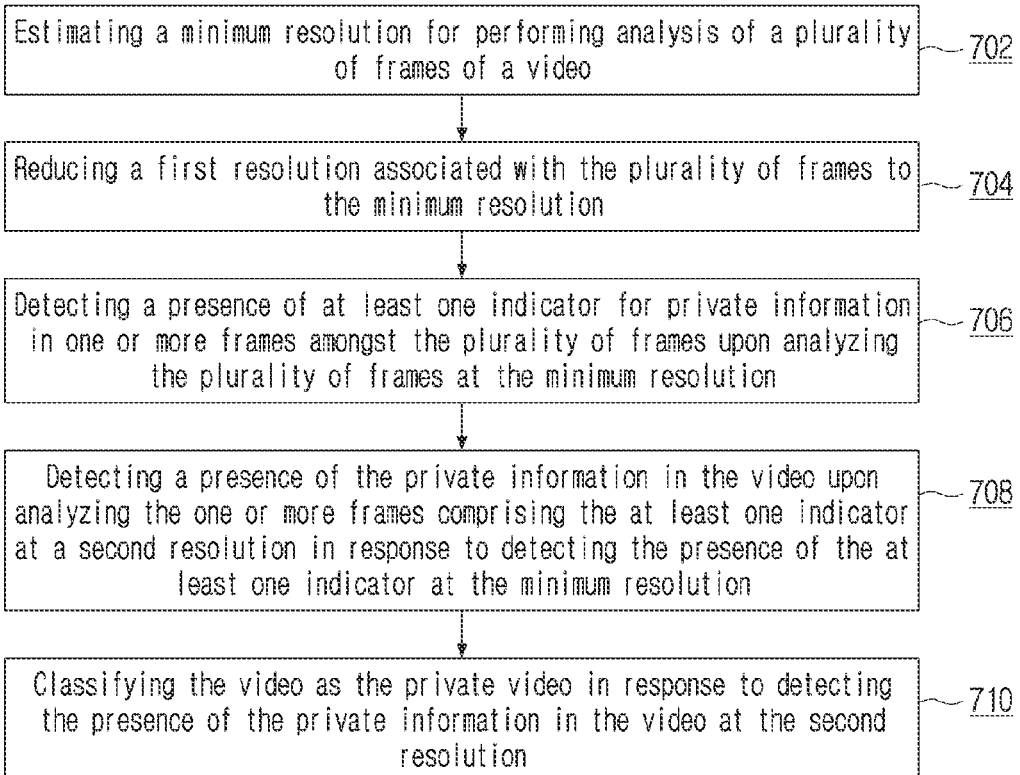

700

Estimating a minimum resolution for performing analysis of a plurality of frames of a video ~ 702

Reducing a first resolution associated with the plurality of frames to the minimum resolution ~ 704

Detecting a presence of at least one indicator for private information in one or more frames amongst the plurality of frames upon analyzing the plurality of frames at the minimum resolution ~ 706

Detecting a presence of the private information in the video upon analyzing the one or more frames comprising the at least one indicator at a second resolution in response to detecting the presence of the at least one indicator at the minimum resolution ~ 708

Classifying the video as the private video in response to detecting the presence of the private information in the video at the second resolution ~ 710

METHOD AND SYSTEM FOR DETECTING PRIVATE VIDEO

CROSS REFERENCE TO RELATED APPLICATION

This application is a continuation of International Application PCT/KR2023/001459, filed Feb. 1, 2023, which is based on and claims priority on Indian Application 202241025604 filed on May 2, 2022 and Indian Application 202241025604 filed on Nov. 10, 2022, in Indian Patent Office, the disclosures of which are all hereby incorporated herein by reference in their entireties.

BACKGROUND

Field

Certain example embodiments relate to content analysis, and for example to a method and/or a system for detecting a private video.

Description of Related Art

Users have a public and private life. Similarly, users receive different types of content on their electronic devices (e.g., smartphones). While accessing the content on their smartphone daily, some parts of the content may be considered by the users as sensitive or private and some as general. The content may be in the form of a video with inappropriate information for general viewing. Because of the aforementioned reason, the users may feel anxious about a nature of the content in the smartphone, as the content may be sensitive and may require filtration.

When the content is in the form of the video, there are many frames to be processed. It is practically impossible to analyze each frame in electronic devices like a smartphone, a tab, or a Television (TV). According to a survey, image content stored on the electronic device is much larger than other Multipurpose Internet Mail Extensions (MIME) types of content. Of all the images, private and personal image content consist of a significant amount. 49% of men and 33% of women saved an explicit photo that they received, 22% of men and 30% of women ask the other person to delete their explicit photos.

Existing video processing-based methods for identifying explicit content fail to address many scenarios with low computation. Semantic features like Not Safe For Work (NSFW), gore, violence, obscene, etc. are not taken into consideration during video encoding. Also, there is no method yet available to automatically detect such videos in the electronic device of a user and recommend appropriate actions such as hiding, encrypting, moving to a secure place, masking, or converting it to content safe for viewing. Furthermore, for example and without limitation, the existing video processing-based methods for video content classification/content detection fail to address the below scenarios:

A. Online on-device video classification: Running any existing video content moderation engine on a video, on-device, is not feasible in practice due to various requirements per video like bit rate, Frames Per Second (FPS), video quality, etc., and device limitations like compute, thermal, and power performances.

B. Wide variety of identifiers: Various semantic features like skin exposure, actions, facial expressions, symbols, etc. could cause a video to be considered NSFW.

C. Far-field, partially visible, and occluded identifiers: In addition to the above, the occurrence of identifiers in far-field or identifiers that are partially visible or occluded can cause additional limitations during playback.

A conventional solution discloses a method to detect motion and then based on the luminance values of the pixels included in each of the plurality of moving picture frames, skin presumed regions presumed to represent the human skin are detected. Furthermore, whether each of the plurality of moving picture frames is a sexually explicit object of pornography object is determined. Another conventional solution discloses a method to filter out the video stream with pornography pictures transmitted via a network. A system for filtering out pornography films includes an image-capturing device and a pornography picture recognition engine. Yet another conventional solution discloses a method to detect adult content in a video using its audio properties. Another conventional solution discloses a method to detect a person, followed by certain motions and gestures in low resolution to raise alert, and then switch to high resolution for a subsequent frame to detect sensitive content. No solution is known to help the user detect explicit content and recommend suitable actions.

There is a need to overcome above-mentioned drawbacks.

SUMMARY

In certain example embodiments, a method for detecting a private video in an electronic device may include estimating, by the electronic device, a minimum or low resolution for performing analysis of a plurality of frames of a video. The method may include reducing, by the electronic device, a first resolution associated with the plurality of frames to the minimum/low resolution. The method may include detecting, by the electronic device, a presence of at least one indicator for private information in one or more frames amongst the plurality of frames upon analyzing the plurality of frames at the minimum/low resolution. The method may include detecting, by the electronic device, a presence of the private information in the video upon analyzing the one or more frames comprising the at least one indicator at a second resolution in response to detecting the presence of the at least one indicator at the minimum/low resolution. The method may include classifying, by the electronic device, the video as the private video in response to detecting the presence of the private information in the video at the second resolution.

In certain example embodiments, a system for detecting the private video in an electronic device may include a resolution regressing engine configured to estimate the minimum/low resolution associated with the plurality of frames of the video. The resolution regressing engine may be configured to reduce the first resolution associated with the plurality of frames to the minimum/low resolution. The system may include a low-resolution analyzer configured to detect the presence of at least one indicator for private information in one or more frames amongst the plurality of frames upon analyzing the plurality of frames at the minimum/low resolution. The system may include a high-resolution analyzer configured to detect the presence of the private information in the video upon analyzing the one or more frames comprising the at least one indicator at the second resolution in response to detecting the presence of the at least one indicator/detector at the low (e.g., minimum) resolution. The system further includes a processor configured to classify the video as the private video in response to detecting the presence of the private information in the video at the second resolution.

To further clarify advantages and features, a more particular description will be rendered by reference to specific example embodiments thereof. It is appreciated that these drawings depict only example embodiments and are not to be considered limiting as to scope.

BRIEF DESCRIPTION OF THE DRAWINGS

The above and other aspects, features, and advantages of certain example embodiments of the present disclosure will be more apparent from the following detailed description, taken in conjunction with the accompanying drawings, in which:

FIG. 3 illustrates an operational flow diagram depicting a process for detecting private information in the video, in accordance with an example embodiment;

FIG. 4 illustrates an architectural diagram depicting a method for detecting private information in the video, in accordance with an example embodiment;

FIG. 6 illustrates a use case diagram depicting masking of one or more frames of the video, in accordance with an example embodiment;

FIG. 7 illustrates a flow diagram depicting a method for detecting the private video in the electronic device, in accordance with an example embodiment; and;

Figure 1:
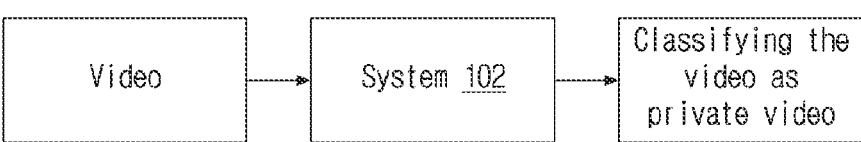
FIG. 1 illustrates a diagram depicting a system implemented in an electronic device for detecting a private video, in accordance with an example embodiment.

Further, skilled artisans will appreciate that elements in the drawings are illustrated for simplicity and may not have necessarily been drawn to scale. For example, the flow charts illustrate the method in terms of the most prominent steps involved to help to improve understanding. Furthermore, in terms of the construction of the device, one or more components of the device may have been represented in the drawings by conventional symbols, and the drawings may show only those specific details that are pertinent to understanding example embodiments so as not to obscure the drawings with details that will be readily apparent to those of ordinary skill in the art having benefit of the description herein.

DETAILED DESCRIPTION

Reference will now be made to example embodiments illustrated in the drawings and specific language will be used to describe the same.

It will be understood by those skilled in the art that the foregoing general description and the following detailed description are explanatory and are not intended to be restrictive thereof.

Reference throughout this specification to "an aspect", "another aspect" or similar language means that a particular feature, structure, or characteristic described in connection with the embodiment(s) is included in at least one embodiment(s).

Unless otherwise defined, all technical and scientific terms used herein have the same meaning as commonly understood by one of ordinary skilled in the art to which this belongs. The system, methods, and examples provided herein are illustrative only and not intended to be limiting.

FIG. 1 illustrates a diagram 100 depicting a system 102 implemented in an electronic device for detecting a private video, in accordance with an example embodiment. The electronic device may one of a smartphone, a Personal Computer (PC), a laptop, a tablet, or the like. The system 102 may be configured to receive a video as an input and classify the video as a private video based on a presence of private information in the video. The system 102 may be a deep learning system (e.g., Convolutional Neural Networks (CNNs), Long Short Term Memory Networks (LSTMs), Long Short Term Memory Networks (LSTMs), etc.) configured to detect the presence of the private information in the video by performing a multiresolution analysis on the video.

The system 102 may be configured to estimate a low (e.g., minimum) resolution for performing an analysis. The analysis may be performed on of a number of frames of the video. Subsequent to analysis of the number of frames, the system 102 may be configured to reduce a first resolution related to the number of frames to the low (e.g., minimum) resolution.

Continuing with the above embodiment, the system 102 may be configured to detect a presence of at least one indicator in the video. The at least one indicator may be related to private information (e.g., explicit nudity, semi nudity, hugging, drinking alcohol, smoking, etc.). Furthermore, the at least one indicator may be present in one or more frames amongst the number of frames of the video. The system 102 may be configured to detect the presence of the at least one indicator upon analyzing the number of frames at the low (e.g., minimum) resolution.

Subsequent to detecting the presence of the at least one indicator for the private information by analyzing the number of frames at the low (e.g., minimum) resolution, the system 102 may be configured to detect a presence of the private information in the video. The presence of the video may be detected by analyzing the one or more frames including the at least one indicator at a second resolution after detecting the presence of the at least one indicator/detector at the low (e.g., minimum) resolution. To that understanding, the system 102 may be configured to classify the video as the private video in response to detecting the presence of the private information in the video at the second resolution.

Figure 2:
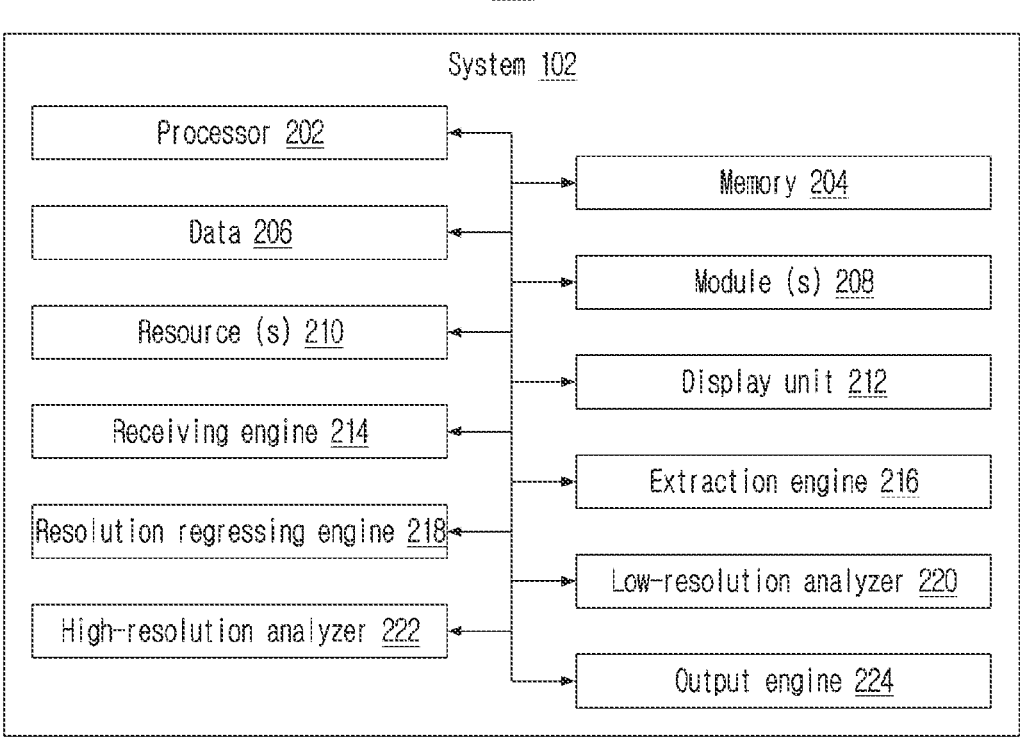
FIG. 2 illustrates a schematic block diagram of the system configured to detect private information in a video, in accordance with an example embodiment.

FIG. 2 illustrates a schematic block diagram 200 of the system 102 configured to detect private information in a video, in accordance with an example embodiment. The system 102 may be configured to analyze the video for detecting the private information in the video. The private information may indicate presence of at least one, for example, but not limited to, private body part, hugging, drinking alcohol, smoking, intimate act in the video. In response to detecting the presence of private information, the system 102 may be configured to classify the video as the private video. The system 102 may be a deep learning system configured to detect the presence of the private information in the video by performing a multiresolution analysis on the video. The system 102 may be implemented in an electronic device. Examples of the electronic device may include but are not limited to, a smartphone, a PC, a laptop, a tablet, or the like.

The system 102 may include a processor 202, a memory 204, data 206, module(s) 208, resource(s) 210, a display unit 212, a receiving engine 214, an extraction engine 216, a resolution regressing engine 218, a low-resolution analyzer 220, a high-resolution analyzer 222, and an output engine 224. In an embodiment, the processor 202, the memory 204, the data 206, the module(s) 208, the resource(s) 210, the display unit 212, the receiving engine 214, the extraction engine 216, the resolution regressing engine 218, the low-resolution analyzer 220, the high-resolution analyzer 222, and the output engine 224 may be communicably coupled to one another. Each "analyzer" herein comprises processing circuitry, and each "engine" and each "module" herein may comprise circuitry.

As would be appreciated, the system 102, may be understood as one or more of a hardware, a software, a logic-based program, a configurable hardware, and the like. For example, the processor 202 may be a single processing unit or a number of units, all of which could include multiple computing units. The processor 202 may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 202 may be configured to fetch and/or execute computer-readable instructions and/or data stored in the memory 204. Each "processor" herein comprises processing circuitry. "Based on" as used herein covers based at least on.

In an example, the memory 204 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes. The memory 204 may include the data 206. The data 206 serves, amongst other things, as a repository for storing data (e.g., video, image frame, etc.) processed, received, and generated by one or more of the processor 202, the memory 204, the module(s) 208, the resource(s) 210, the display unit 212, the receiving engine 214, the extraction engine 216, the resolution regressing engine 218, the low-resolution analyzer 220, the high-resolution analyzer 222, and the output engine 224.

The module(s) 208, amongst other things, may include routines, programs, objects, components, data structures, etc., which perform particular tasks or implement data types. The module(s) 208 may also be implemented as, signal processor(s), state machine(s), logic circuitries, and/or any other device or component that manipulates signals based on operational instructions.

Further, the module(s) 208 may be implemented in hardware, as instructions executed by at least one processing unit, e.g., processor 202, or by a combination thereof. The processing unit may be a general-purpose processor that executes instructions to cause the general-purpose processor to perform operations or, the processing unit may be dedicated to performing the required functions. In another aspect, the module(s) 208 may be machine-readable instructions (software) that, when executed by a processor/processing unit, may perform any of the described functionalities.

In some example embodiments, the module(s) 208 may be machine-readable instructions (software) which, when executed by a processor 202/processing unit, perform any of the described functionalities.

The resource(s) 210 may be physical and/or virtual components of the system 102 that provide inherent capabilities and/or contribute towards the performance of the system 102. Examples of the resource(s) 210 may include, but are not limited to, a memory (e.g., the memory 204), a power unit (e.g., a battery), a display unit (e.g., the display unit 212), etc. The resource(s) 210 may include a power unit/battery unit, a network unit, etc., in addition to the processor 202, and the memory 204.

The display unit 212 may display various types of information (for example, media contents, multimedia data, text data, etc.) to the system 102. The display unit 212 may include, but is not limited to, a liquid crystal display (LCD), a light-emitting diode (LED) display, an organic LED (OLED) display, a plasma cell display, an electronic ink array display, an electronic paper display, a flexible LCD, a flexible electrochromic display, and/or a flexible electrowetting display.

Continuing with the above embodiment, the receiving engine 214 may be configured to receive an input. The input may be the video. In an embodiment, the video may be received from the memory 204 such that the video may be pre-stored in the electronic device. In another embodiment, the video may be received from another electronic device.

Subsequent to receiving the video, the extraction engine 216 may be configured to extract a number of frames from the video. Each frame amongst the number of frames of the video may be a keyframe. Further, each frame amongst the number of frames may be an inline frame (iframe).

To that understanding, upon extraction of the number of frames from the video by the extraction engine 216, the resolution regressing engine 218 may be configured to estimate a low (e.g., minimum) resolution related to the number of frames in the video. The low (e.g., minimum) resolution may be categorized amongst an ultra-low resolution, a low resolution, and a medium resolution by the resolution regressing engine 218. The low (e.g., minimum) resolution may be a minimum required resolution for the number of frames of the video. Estimating the low (e.g., minimum) resolution by the resolution regressing engine 218 may be based on one or more of a number of latent parameters and a number of heuristic parameters related to the video. Further, the number of latent parameters may include two or more of a readability of text in the video, a visual clarity of the video, a percentage of pixels of the video, an adversarial nature of the video, a transformation of orientations of the video caused due to change in a resolution of the video, and an aliasing caused due to the change in the first resolution of the video. Furthermore, the number of heuristic parameters may be received from a look up database and may include two or more of a color, an image compression quality, a percentage of contiguous region, a number of contours in the video, a computed histogram of gradients in the video, and text in the video. Moving forward, upon estimating the low (e.g., minimum) resolution, the resolution regressing engine 218 may be configured to reduce a first resolution related to the number of frames of the video to the low (e.g., minimum) resolution.

Continuing with the above embodiment, the low-resolution analyzer 220 may be configured to analyze the number of frames of the video at the low (e.g., minimum) resolution. The analysis may be performed in order to detect whether at least one indicator associated with private information is present in one or more frames amongst the number of frames of the video. The at least one indicator may be one or more of an obscenity in the content, a presence of alcohol in the content, and a vice content. Furthermore, the private information may indicate presence of at least one private body part in the one or more frames. Furthermore, the low-resolution analyzer 220 may be configured to determine whether a number of one or more frames including the at least one indicator is greater than a pre-defined threshold number of frames. In an embodiment, where it is determined that number of one or more frames including the at least one indicator is greater than the pre-defined threshold number of frames, the low-resolution analyzer 220 may be configured to pass the one or more frames to the high-resolution analyzer 222.

Subsequent to detecting the presence of the at least one indicator in the one or more frames in the video, the high-resolution analyzer 222 may be configured to analyze the one or more frames. The one or more frames may be analyzed in order to detect a presence of the private information in the video. The one or more frames may be analyzed by the high-resolution analyzer 222 at a second resolution. The second resolution may be greater than the low (e.g., minimum) resolution and lower than the first resolution of the video.

Continuing with the above embodiment, the processor 202 may be configured to classify video as the private video in response to detecting the presence of the private information in the video at the second resolution. For classifying the video as the private video, the processor 202 may be configured to mark the one or more frames as one or more private frames in response to detecting the private information in the one or more frames of the video. Furthermore, the processor 202 may be configured to determine whether a number of the one or more private frames from the one or more frames in the video is greater than a pre-determined threshold number of frames. In an embodiment, where it is determined that the one or more private frames from the one or more frames in the video is greater than a pre-determined threshold number of frames, the processor 202 may be configured to classify the video as the private video.

Moving forward, the output engine 224 may be configured to provide one or more suggestions to a viewer. The one or more suggestion may be related to converting the private video to a video without the private information in response to detection of the presence of the private information in the private video.

FIG. 3 illustrates an operational flow diagram 300 depicting a process for detecting private information in a video, in accordance with an example embodiment. The process 300 may be performed by the system 102 as referred in the FIG. 1 and FIG. 2. Further, the process 300 may be implemented in an electronic device. Examples of the electronic device may include, but are not limited to, a smartphone, a PC, a laptop, a tablet, or the like. The private information may indicate presence of at least one, for example, private body part, hugging, drinking alcohol, smoking, intimate act in the video. The private information may be detected in the video based on detecting a presence of at least one indicator in the video. The process 300 may include predicting a low (e.g., minimum) resolution for a number of frames related to the video and analyzing the number of frames for detecting the at least one indicator in the video. The at least one indicator may be obscenity in the content, a presence of alcohol in the content, and/or a vice content.

At step 302, the process 300 may include receiving the video as an input. In an embodiment, the video may be pre-stored in the electronic device and received from the memory 204. In another embodiment, the video may be received from another electronic device.

At step 304, the process 300 may include extracting the number of frames from the video. The number of frames extracted from the video may be key frames for detecting the private information in the video. Furthermore, each frame amongst the number of frames may be an inline frame (iframe). The number of frames may be extracted in a Red, Green, Blue (RGB) format by the extraction engine 216 as referred in the FIG. 2. There are pre-defined dimensions for each of the number frames, such as 128×128.

At step 306, the process 300 may include estimating the low (e.g., minimum) resolution suitable for processing the number of frames extracted from the video. The low (e.g., minimum) resolution may be estimated by the resolution regressing engine 218 as referred to in FIG. 2. The resolution regressing engine 218 may employ a deep learning model (the deep learning system) for estimating the low (e.g., minimum) resolution. A number of trained weights for deep learning model operations of the deep learning model may be executed to estimate the low (e.g., minimum) resolution along with utilizing a number of latent features related to a number of latent parameters and a number of heuristic features related to a number of heuristic parameters.

Subsequently, the number of latent parameters may include two or more of the readability of text in the video, the visual clarity of the video, a percentage of pixels of the video, an adversarial nature of the video, a transformation of orientations of the video caused due to change in a resolution of the video, and an aliasing caused due to the change in the first resolution of the video. Furthermore, the number of heuristic parameters may include two or more of a color, an image compression quality, the percentage of the contiguous region, the number of contours in the video, the computed histogram of gradients in the video, and text in the video. Continuing with the above embodiment, the low (e.g., minimum) resolution may be categorized amongst the ultra-low resolution, the low resolution, and the medium resolution by the resolution regressing engine 218. The low (e.g., minimum) resolution may depend on a specific task in a generic scenario.

At step 308, the process 300 may include reducing a first resolution related to the number of frames to the low (e.g., minimum) resolution. The first resolution may be reduced to the low (e.g., minimum) resolution by the resolution regressing engine 218. The first resolution may be reduced to the low (e.g., minimum) resolution by resizing the number of frames to the low (e.g., minimum) resolution.

At step 310, the process 300 may include analyzing the number of frames of the video at the low (e.g., minimum) resolution. The analysis may be performed by the low-resolution analyzer 220 as referred to in FIG. 2 to detect whether at least one indicator associated with private information is present in one or more frames amongst the number of frames of the video. The process 300 may include executing the number of trained weights for deep learning model operations of the deep learning model to classify the video in a Not Safe For Work (NSFW) class by detecting the at least one indicator associated with the private information. In addition, the video may be classified into the number of other classes. In an exemplary embodiment, the number of other classes may be 80. The at least one indicator may be one or more of obscenity in the content, a presence of alcohol in the content, and vice content. Furthermore, the private information may indicate the presence of at least one private body part in the one or more frames. In an embodiment, bounding rectangles with a confidence score beyond a certain threshold may be predicted for the at least one private body parts. In an embodiment, where it is determined that the at least body part is not detected, the bounding rectangles are not returned.

Moving forward, the process 300 may include determining by the low-resolution analyzer 220 whether a number of one or more frames of pre-defined dimension, such as 300×300 including the at least one indicator is greater than a pre-defined threshold number of frames such that the NSFW class is above pre-determined threshold. In an embodiment, where it is determined that number of one or more frames including the at least one indicator is greater than the pre-defined threshold number of frames the video is classified as NSFW or sensitive and the one or more frames may be passed to the high-resolution analyzer 222.

Subsequently, the one or more frames may be passed to the high-resolution analyzer 222 with pre-defined dimensions, such as 320×320. In an embodiment, the number of the one or more private frames may be equated to a prediction confidence such that when the prediction confidence is higher than the pre-determined threshold number of frames, the video may be classified as a private video. In an embodiment, where it is determined that the number of one or more frames is greater than a pre-determined higher threshold number of frames, the number of one or more frames may be classified as the private video by the processor 202.

At step 312, the process 300 may include analyzing the one or more frames in the video by the high-resolution analyzer 222 as referred in the FIG. 2. The analysis may be performed to detect a presence of the private information in the video. The analysis may be performed at a second resolution such that the second resolution may be greater than the low (e.g., minimum) resolution and lower than the first resolution of the video.

At step 314, the process 300 may include classifying the video as the private video by the processor 202 as referred in the FIG. 2. The video may be classified as the private video based on the detecting presence of the private information in the video at the second resolution. The process 300 may include marking the one or more frames as one or more private frames in response to detecting the private information in the one or more frames of the video for classifying the video. Furthermore, the process 300 may include determining whether a number of the one or more private frames from the one or more frames in the video is greater than a pre-determined threshold number of frames. In an embodiment, where it is determined that the number of one or more private frames from the one or more frames in the video is greater than a pre-determined threshold number of frames, the video may be classified as the private video.

At step 316, the process 300 may include providing one or more suggestions to a viewer by the output engine 224 as referred to in FIG. 2. The one or more suggestion may be related to converting the private video to a video without the private information in response to detecting the presence of the private information in the private video.

FIG. 4 illustrates an architectural diagram depicting a method 400 for detecting private information in a video, in accordance with an example embodiment. The method 400 may be performed by the system 102 as referred to in FIG. 1 and FIG. 2. The architectural diagram includes the extraction engine 216, the resolution regressing engine 218, the low-resolution analyzer 220, the high-resolution analyzer 222, and a policy manager 402. The low-resolution analyzer

220 may include an ultra-low-resolution classifier 404, a low-resolution classifier 406, and a medium-resolution classifier 408.

Continuing with the above embodiment, the extraction engine 216 may be configured to extract a number of frames from the video. Each frame amongst the number of frames of the video may be a keyframe. Further, each frame amongst the number of frames may be an inline frame (iframe). Moving forward, the resolution regressing engine 218 may be configured to analyze each frame from the number of frames to predict a suitable resolution for each frame. Each of the numbers of frames may be processed at the suitable resolution. The suitable resolution may be a low (e.g., minimum) resolution required to process the number of frames. The suitable frame may interchangeably be referred to as a low (e.g., minimum) resolution. The low (e.g., minimum) resolution may be categorized amongst an ultra-low resolution, a low resolution, and a medium resolution by the resolution regressing engine 218.

Continuing with the above embodiment, the low-resolution analyzer 220 may be configured to analyze the number of frames of the video at the low (e.g., minimum) resolution. The analysis may be performed in order to detect whether at least one indicator associated with private information is present in one or more frames among the number of frames of the video. The at least one indicator may be one or more of obscenity in the content, a presence of alcohol in the content, and vice content. Furthermore, the private information may indicate the presence of at least one private body part in the one or more frames. Each frame from the number of frames with the ultra-low resolution may be processed by the ultra-low-resolution classifier 404. Each frame from the number of frames with the low resolution may be processed by the low-resolution classifier 406. Each frame from the number of frames with the medium resolution may be processed by the medium resolution classifier 408. Furthermore, the low-resolution analyzer 220 may be configured to determine whether a number of one or more frames including the at least one indicator is greater than a pre-defined threshold number of frames. In an embodiment, where it is determined that the number of one or more frames including the at least one indicator is greater than the pre-defined threshold number of frames, the low-resolution analyzer 220 may be configured to pass the one or more frames to the high-resolution analyzer 222.

Subsequently, the high-resolution analyzer 222 may be configured to analyze the one or more frames to detect the presence of private information in the video at a second resolution greater than the low (e.g., minimum) resolution and lower than the first resolution of the video.

Furthermore, the policy manager 402 may be configured to define and manage one or more thresholds required to determine if at least one of the one or more frames may be declared as a private frame or a non-private frame. The declaration may be performed by the at least one processor 202. Continuing with the above embodiment, the processor 202 may be configured to classify video as the private video in response to detecting the presence of the private information in the video at the second resolution. For classifying the video as the private video, the processor 202 may be configured to mark the one or more frames as one or more private frames in response to detecting the private information in the one or more frames of the video. Furthermore, the processor 202 may be configured to determine whether a number of the one or more private frames from the one or more frames in the video is greater than a pre-determined threshold number of frames. In an embodiment, where it is determined that the one or more private frames from the one or more frames in the video are greater than a pre-determined threshold number of frames, the processor 202 may be configured to classify the video as the private video.

Figure 5:
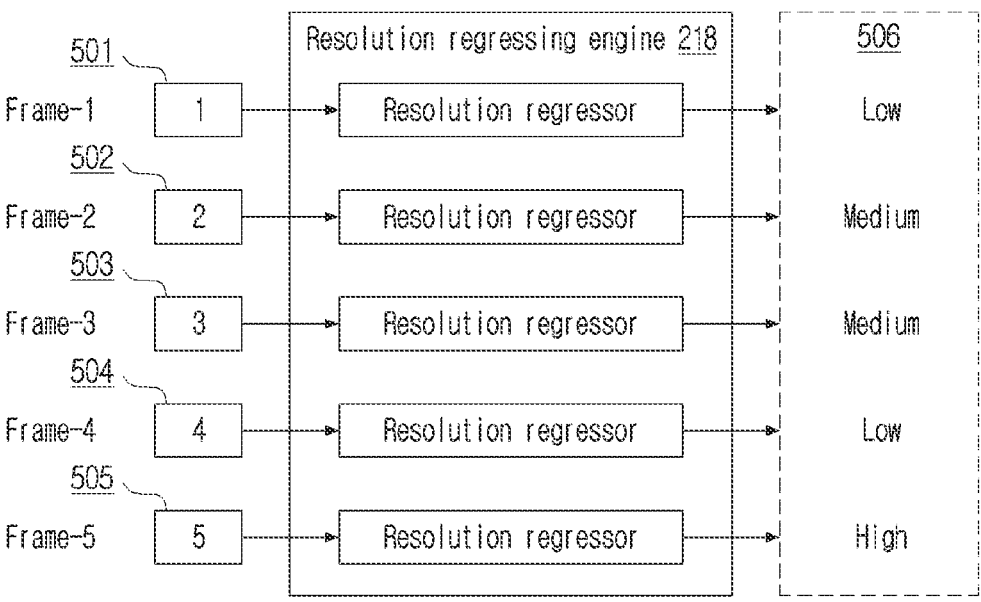
FIG. 5 illustrates an operational flow diagram depicting a process for predicting a resolution suitable for processing a number of frames associated with the video, in accordance with an example embodiment.

FIG. 5 illustrates an operational flow diagram depicting a process 500 for predicting a resolution suitable for processing a number of frames (501, 502, 503, 504, and 505) associated with the video, in accordance with an example embodiment. Each frame may include different content of the video. The process 500 may be performed by the resolution regressing engine 218 as referred to in FIG. 2. Further, the resolution may be a low (e.g., minimum) resolution related to the number of frames for processing the number of frames. The resolution may interchangeably be referred to as the low (e.g., minimum) resolution. The number of frames may be passed to the resolution regressing engine 218 and processed at the low (e.g., minimum) resolution such that the number of frames may be utilized for further processing using neural networks. A suitable frame may be predicted for each frame amongst the number of frames. The predicted resolutions may be grouped into a number of categories (506) such as an ultra-low-resolution category, a low-resolution category, and a medium-resolution category. The ultra-low-resolution category may be related to the low (e.g., minimum) resolution ranging, for example, from 32×32 to 96×96. The low-resolution category may be related to the low (e.g., minimum) resolution ranging, for example, from 128×128 to 256×256. The medium-resolution category may be related to the low (e.g., minimum) resolution ranging, for example, from 320×320 to an input frame size.

FIG. 6 illustrates a use case diagram 600 depicting masking of one or more frames of the video, in accordance with an example embodiment. The masking may be performed based on determining that private information is present in the one or more frames of the video (601). The video (601) may be decoded by a decoder (602), detects the private information/action associated with the video (601) and the presence of explicit or vice content may be detected in a generic Region Of Interest (ROI) of the video (601). Co-ordinates associated with the ROI may be masked (603) and one or more masked frames (604) may be generated.

FIG. 7 illustrates a flow diagram depicting a method 700 for detecting the private video in the electronic device, in accordance with an example embodiment. The method 700 may be implemented by the system 102 using components thereof, as described above in an embodiment, the method 700 may be executed by the receiving engine 214, the extraction engine 216, the resolution regressing engine 218, the low-resolution analyzer 220, the high-resolution analyzer 222, and the output engine 224. Further, for the sake of brevity, details are explained in detail in the description of FIG. 1 to FIG. 7 are not explained in detail in the description of FIG. 7.

At block 702, the method 700 includes estimating, by the electronic device, the low (e.g., minimum) resolution for performing analysis of the plurality of frames of the video.

At block 704, the method 700 includes reducing, by the electronic device, the first resolution associated with the plurality of frames to the low (e.g., minimum) resolution.

At block 706, the method 700 includes detecting, by the electronic device, the presence of at least one indicator for private information in one or more frames amongst the plurality of frames upon analyzing the plurality of frames at the low (e.g., minimum) resolution.

At block 708, the method 700 includes detecting, by the electronic device, the presence of private information in the video upon analyzing the one or more frames comprising the at least one indicator at a second resolution in response to detecting the presence of the at least one indicator at the low (e.g., minimum) resolution.

At block 710, the method 700 includes classifying, by the electronic device, the video as the private video in response to detecting the presence of private information in the video at the second resolution.

Figure 8:
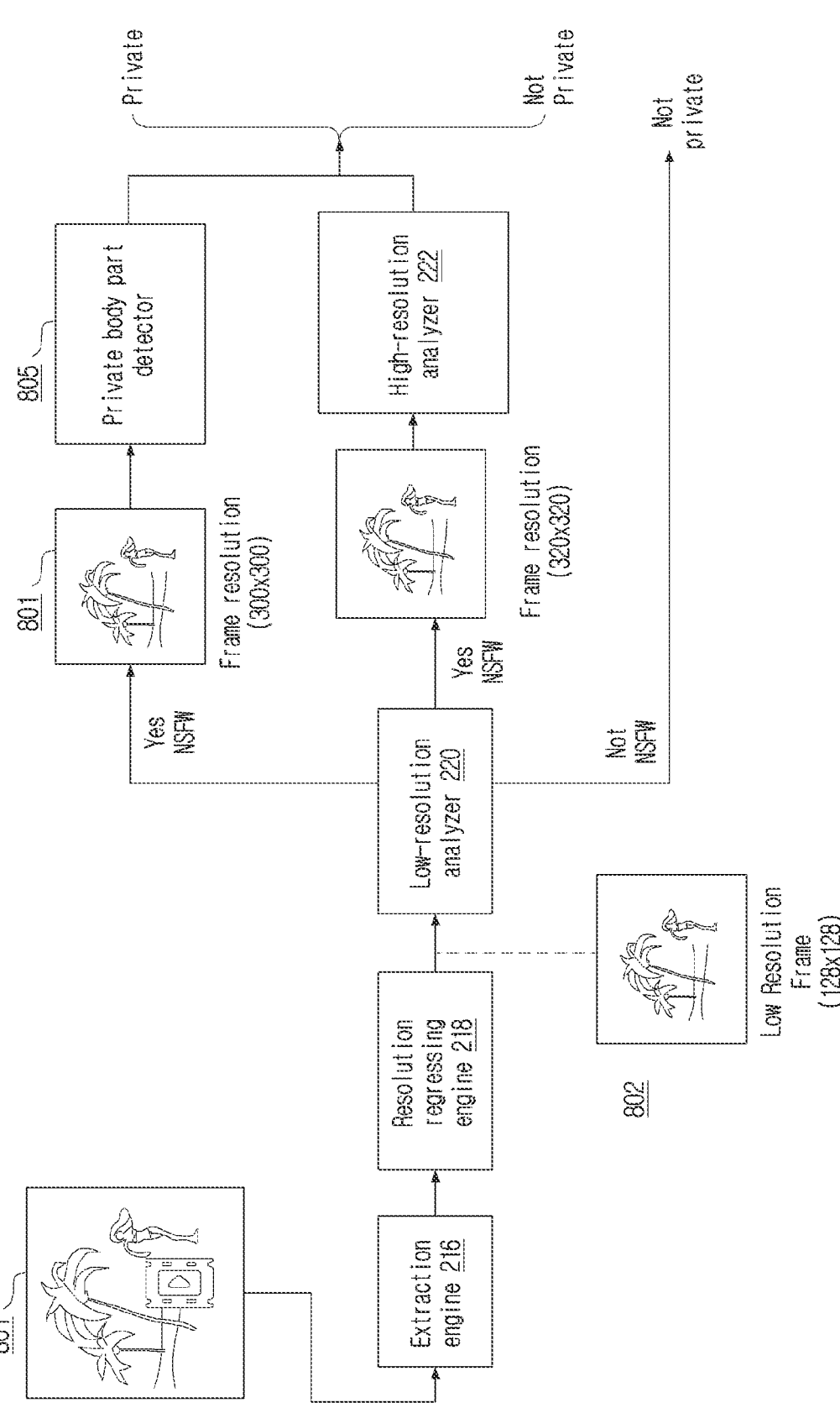
FIG. 8 illustrates an example scenario to detect the private information in the video using a low resolution analyzer, in accordance with an example embodiment.

FIG. 8 illustrates an example scenario to detect the private information in the video using the low-resolution analyzer (220), in accordance with an example embodiment.

Each embodiment herein may be used in combination with any other embodiment(s) described herein.

The extraction engine 216 extracts the i-frames from the video 801. The resolution regressing engine 218 then determines the suitable resolution to analyze the frame 802 (e.g., low resolution frame 128×128) further in a pipeline. The low-resolution analyzer 220 processes the frame 802. It's faster with less compute and designed to produce very high Recall. If not found, then the next frame is processed. If a potential NSFW frame 804 is observed, for example, a high-resolution frame (e.g., 300×300) is further passed to a private body part detector 805 for detection of any exposed private parts in the frame 804. If found, the frame is considered private. If not found, the frame 803 (e.g., high resolution frame 320×320) is passed in the high-resolution analyzer 222 to a NSFW classifier for detection of any NSFW content in the frame 803, functionality of each hardware entity (e.g., processor(s) including processing circuitry) is given in Table-1.

TABLE 1

| Hardware entity | Input | Processing | Output |
|---|---|---|---|
| Resolution regressing engine 218 | Extracted frame in RGB format | Trained weights for deep learning model operations are executed to predict the suitable resolution for further processing in the pipeline. Based on the prediction, the frame is resized and passed on for further analysis by the suitable low resolution model/low resolution analyzer. | 3 class labels are detected for the input image. The class labels represent low, medium or high as determined during training. The number of labels depends on the specific task in a generic scenario. |
| Low-resolution analyzer 220 | RGB frame of size 128 × 128 (as | Trained weights for Deep Learning model operations are executed to classify images into NSFW (Not Safe For Work) class. In addition, it | 81 class labels are detected for the input image. If NSFW class is detected above a certain threshold, the image is |

TABLE 1-continued

| Hardware entity | Input | Processing | Output |
|---|---|---|---|
| | determined by the Resolution Regressor) | classifies over 80 types of other classes. | considered to be NSFW or sensitive |
| Private body part detector | RGB frame of size 300 × 300 | Trained weights for deep learning model operations are executed to localize private body parts present in the input image | Bounding reacts with a confidence score beyond a certain threshold, for detected private body parts are predicted. If no body parts detected, then no bounding reacts are returned. |
| High-resolution analyzer 222 | RGB frame of size 320 × 320 | Trained weights for Deep Learning model operations are executed to classify images into NSFW (Not Safe For Work) class. In addition, it classifies over 80 types of other classes. | 81 class labels are detected for the input image. If NSFW class is detected above a certain threshold, the image is considered to be NSFW or sensitive |

In an embodiment, the pipeline's major advantages such as, power consumption is decreased by processing first frames at a low resolution, initial frame processing at a low resolution enhances thermal performance, and time performance is increased by processing first frames at the low resolution.

While specific language has been used to describe the present subject matter, any limitations arising on account thereto, are not intended. As would be apparent to a person in the art, various working modifications may be made to the method to implement the inventive concepts as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method in an electronic device comprising at least one processor, for detecting a private video in the electronic device, the method comprising:

estimating a low resolution for performing analysis of a plurality of frames of a video;

reducing a first resolution associated with the plurality of frames to the low resolution;

detecting a presence of at least one indicator for private information in one or more frames amongst the plurality of frames upon analyzing the plurality of frames at the low resolution;

detecting a presence of the private information in the video upon analyzing the one or more frames comprising the at least one indicator at a second resolution in response to at least detecting the presence of the at least one indicator at the low resolution; and classifying, by the electronic device, the video as the private video in response to at least detecting the presence of the private information in the video at the second resolution, wherein estimating the low resolution for the plurality of frames is based on at least one of a plurality of latent parameters and a plurality of heuristic parameters associated with the video.

2. The method as claimed in claim 1, comprising:

providing one or more suggestions to a user for converting the private video to a video without the private information in response to a detection of the private video.

3. The method as claimed in claim 1, comprising:

receiving the video comprising a plurality of frames; and extracting the plurality of frames from the video and selecting the plurality of frames from the plurality of frames, wherein each frame amongst the plurality of frames is a key frame in the video.

4. The method as claimed in claim 1, comprising:

marking the one or more frames as one or more private frames in response to at least detecting the private information in the one or more frames of the video; and classifying the video as the private video in response to at least determining that a number of the one or more private frames are greater than a pre-determined threshold number of frames.

5. The method as claimed in claim 1, wherein the low resolution is at least one of an ultra-low resolution, a low resolution, and a medium resolution by a resolution regressing engine.

6. The method as claimed in claim 1, wherein the one or more frames is passed to a high-resolution analyzer based on the one or more frames comprising the at least one indicator being greater than a pre-defined threshold number of frames.

7. The method as claimed in claim 1, wherein the at least one indicator comprises at least one of obscenity in the content, a presence of alcohol in the content, and a vice content.

8. The method as claimed in claim 1, wherein the private information indicates presence of at least one private body part in the one or more frames.

9. The method as claimed in claim 1, wherein the plurality of latent parameters comprises two or more of a readability of text in the video, a visual clarity of the video, a percentage of pixels of the video, an adversarial nature of the video, a transformation of orientations of the video caused due to change in a resolution of the video, and an aliasing caused due to the change in the first resolution of the video.

10. The method as claimed in claim 1, wherein the plurality of heuristic parameters comprises two or more of a color, an image compression quality, a percentage of contiguous region, a number of contours in the video, a computed histogram of gradients in the video, and text in the video.

11. The method as claimed in claim 1, wherein each frame amongst the plurality of frame comprises an inline frame (iframe).

12. The method as claimed in claim 1, wherein the second resolution is greater than the low resolution and lower than the first resolution of the video.

13. A system for detecting a private video in an electronic device, the system comprising:

a resolution regressing engine, comprising processing circuitry, configured to:

estimate a low resolution associated with a plurality of frames of a video; and reduce a first resolution associated with the plurality of frames to the low resolution;

a low-resolution analyzer, comprising circuitry, configured to detect a presence of at least one indicator for private information in one or more frames amongst the plurality of frames based on analyzing the plurality of frames at the low resolution;

a high-resolution analyzer, comprising circuitry, configured to detect a presence of the private information in the video upon analyzing the one or more frames comprising the at least one indicator at a second resolution based on detection of the presence of the at least one indicator at the low resolution; and a processor, comprising circuitry, configured to classify the video as the private video based on detection of the presence of the private information in the video at the second resolution, wherein estimating the low resolution for the plurality of frames is based on at least one of a plurality of latent parameters and a plurality of heuristic parameters associated with the video.

14. The system as claimed in claim 13, comprising:

an output engine, comprising circuitry, configured to provide one or more suggestions to a viewer for converting the private video to a video without the private information in response to a detection of the private video.

\* \* \* \* \*